United States Patent [19]
Wilson et al.

[11] Patent Number: 5,245,672
[45] Date of Patent: Sep. 14, 1993

[54] OBJECT/ANTI-OBJECT NEURAL NETWORK SEGMENTATION

[75] Inventors: Charles L. Wilson, Darnestown; Michael D. Garris, Gaithersburg; Robert A. Wilkinson, Jr., Hyattstown, all of Md.

[73] Assignee: The United States of America as represented by the Secretary of Commerce, Washington, D.C.

[21] Appl. No.: 847,490

[22] Filed: Mar. 9, 1992

[51] Int. Cl.$^5$ ............................................. G06K 9/00
[52] U.S. Cl. ........................................ 382/9; 382/32; 382/14
[58] Field of Search .................. 382/9, 48, 14, 15, 34, 382/32, 33

[56] References Cited

U.S. PATENT DOCUMENTS

| | | | |
|---|---|---|---|
| 3,295,106 | 12/1966 | Horn | 382/32 |
| 4,510,617 | 4/1985 | Mori | 382/33 |
| 4,790,024 | 12/1988 | Peppers | 382/32 |
| 4,809,344 | 2/1989 | Peppers | 382/32 |
| 4,817,169 | 3/1989 | Peppers | 382/9 |
| 4,827,529 | 5/1989 | Peppers | 382/33 |
| 5,014,327 | 5/1991 | Potter | 382/33 |
| 5,020,117 | 5/1991 | Ooi | 382/33 |

*Primary Examiner*—Leo H. Boudreau
*Attorney, Agent, or Firm*—Frank M. Linguiti

[57] ABSTRACT

The system of the present invention applies self-organizing and/or supervised learning network methods to the problem of segmentation. The segmenter receives a visual field, implemented as a sliding window and distinguishes occurrences of complete characters from occurrences of parts of neighboring characters. Images of isolated whole characters are true objects and the opposite of true objects are anti-objects, centered on the space between two characters. The window is moved across a line of text producing a sequence of images and the segmentation system distinguishes true objects from anti-objects. Frames classified as anti-objects demarcate character boundaries, and frames classified as true objects represent detected character images. The system of the present invention may be a feedforward adaption using a symmetric triggering network. Inputs to the network are applied directly to the separate associative memories of the network. The associative memories produce a best match pattern output for each part of the input data. The associative memories provide two or more subnetworks which define data subsets, such as objects or anti-objects, according to previously learned examples. Multi-layer perceptron architecture may also be used in the system of the present invention rather than the symmetrically triggered feedforward adaptation with tradeoffs in training time but advantages in speed.

15 Claims, 5 Drawing Sheets

TEST FRAMES

OBJECT/ANTI-OBJECT NEURAL NETWORK SEGMENTATION

BACKGROUND OF THE INVENTION

Character recognition, the classification of well formed and cleanly segmented characters, is well known in the prior art. One problem in the prior art of character recognition is automated segmentation where automated segmentation is understood to include the separation of text images into individual letters, one letter per image. Without this essential component, character-based classifiers can not function.

In prior art character recognition systems the segmentation of the characters is one of the major sources of error. Accuracy for segmentation in these prior art systems is well over ninety-nine percent for machine print, approximately ninety percent for hand print, and zero for connected handwritten script. Thus, in order to improve the performance of character recognition systems, it is useful to increase the segmentation accuracy for handprint and make it possible to perform the type of segmentation required for segmenting connected handwritten script. Additionally, in the field of document imaging systems, it would be very useful to have a system which makes use of off-line images rather than on-line strokes for improving the performance of segmentation during the recognition of handwritten script.

A common prior art method of handprint segmentation uses histograms to separate the space between letters with vertical lines. This method is about sixty percent effective on handprint. This method can be made ninety percent effective by two modifications. Statistical rules such as rules involving the expected width of a character or the expected aspect ratio of a character may be added to detect bad segmentations. Additionally, bad segmentation may be corrected by using the best possible straight line, not necessarily vertical, to separate the characters.

In conventional character recognition processes both the positive image of the character and the negative image of the space around the character are available as guides in segmenting and identifying characters. In a similar manner an idealized character segmenter can find the best curve through the negative space between characters to separate characters. If a large number of these curves is previously learned, then characters which are touching, such as handwritten script, could be separated because the resulting negative space will be recognized as being more like a space and less like a character.

Another major problem in the prior art character recognition processes is that a large number of anti-objects must be learned. For example, if each object to be recognized can be followed by any of the remaining objects, $n^2$ anti-objects must be learned for n classes. This $O(n^2)$ problem made these processes very cumbersome.

A model recognition system has been implemented on a massively parallel computer at The National Institute of Standards and Technology. The system consists of eight functional components. The loading of the image into the system and storing the recognition results from the system are I/O components. In between are components responsible for image processing and recognition. The first image processing component is responsible for image correction for scale and rotation, data field isolation, and character data location within each field. The second performs character segmentation. The third image processing component does spatial normalization.

Three recognition components are responsible for feature extraction and character reconstruction, neural network-based character recognition, and low-confidence classification rejection. Studies have shown that traditional image processing techniques used for character segmentation, even when implemented on a parallel computer, require fifty five percent of the system's processing time at a rate less than eight characters per second. A form containing one hundred thirty hand-printed characters requires seventeen seconds of processing just for character segmentation using histograms. This is much longer than the one second per page throughput required by many automated document processing applications. In order to improve segmentation, alternative methods are being explored.

It is also known in the art to perform self-organizing pattern recognition. Self-organizing pattern detection and matching using a system having multiple associative memories is taught by Charles L. Wilson in "Multiple Memory Self-Organization Pattern Recognition Network", U.S. patent application Ser. No. 07/701,484, filed on May 16, 1991. The multiple associative memories of the system of Wilson are able to learn the patterns in a sample of data without prior knowledge of the classes. This prior art self-organizing detection system learns a pattern by means of a feed-forward adaptation using symmetric triggering. Input to the pattern detection system is applied directly to each of the associative memories. The associative memories produce a best match pattern output for each class while simultaneously smoothing and generalizing the input data. Thus the need for prefiltering of data is eliminated. Each memory may contain data of a different pattern type. These matched patterns are reduced to a match signal strength. A match strength signal is produced for each applied signal and each associative memory. All matched strength signals in the system of Wilson may be computed in parallel.

The matched strength signals of Wilson are processed to produce a logical-type signal for each memory. The logical match signals are combined to provide a logical learning trigger signal which allows acceptable patterns to be used to update a specific associative memory. It is also permitted in the system of Wilson for each associative memory to be updated by a separate learning method. The architecture provides multi-map, self-organizing pattern recognition which allows massively parallel learning features using different maps for each feature type.

The method taught by Wilson is thus similar to the multi-map structures believed to exist in the vertebrate cerebral cortex. The technique taught thus consists of sets of associative memory locations, one for each feature type, in which learning is symmetrically triggered by logical combinations of the associative strengths of the memory blocks. Each map is independent of the others except for the connections used to trigger learning. The learning used to update memory locations uses a feed forward mechanism and is self-organizing and stable.

It is also known in the prior art to perform segmentation using a more traditional neural network architecture known as a multi-layered perceptron network. This type of neural network classifies images by generating feedforward activations across a fully connected network containing an input layer, one or more hidden layers, and an output layer. Supervised training may be done using scaled conjugate gradient learning or back propagation. Using the multi-layered perceptron architecture trained with Gabor feature vectors, character recognition accuracy of 99.8% for medium quality machine print has been demonstrated in M. D. Garris, R. A. Wilkinson, C. L. Wilson, "Methods for Enhancing Neural Network Handwritten Character Recognition," International Joint Conference on Neural Networks, Vol. I, pp. 695–700, Seattle, 1991.

Gabor functions such as those in the system of Garris are a set of incomplete nonlinear functions which reduce random image noise and smooth irregularities in image structure by acting as spatially localized low-pass filters. Gabor functions provide the minimum combination of uncertainty in position and spatial frequency resolution, and they match the visual receptor field profiles of mammalian eyes. See J. G. Daugman, "Complete Discrete 2-D Gabor Transform by Neural Networks for Image Analysis and Compression,", IEEE Trans. on ASSP, Vol. ASSP-36, pp. 1169–1179, 1988 for further information on these functions.

These Gabor functions may be used in two different ways. Gabor reconstructed characters are enhanced by emphasizing the body of the character, reducing both the variations along its edges due to digitization and by normalizing its stroke width. These functions can also be used to create feature vectors for multi-layer perception networks.

SUMMARY OF THE INVENTION

The system of the present invention is an application of self-organizing and/or supervised learning network methods to the problem of segmentation. Segmentation is the subdivision of a single set of input data into subsets based on the detection of specific characteristics within the input data. Segmentation may be thought of as a two-object classifier. If a character segmenter is given a visual receptor field, implemented as a sliding window, then the task of the segmenter is to distinguish occurrences of a complete character in its visual field from occurrences of parts of neighboring characters. Images of isolated whole characters are referred to as true objects. The opposite of true objects are images centered on the space between two neighboring characters, referred to as anti-objects. The images contained in the segmenter's visual field are referred to as frames. A simple segmenter may be implemented by training a neural network to distinguish true objects from anti-objects. A window may be incrementally moved across a line of text producing a sequence of image or frames. Frames classified as anti-objects demarcate character boundaries, and frames classified as true objects represent detected character images.

Once the subsets of the input data are labeled by sub-class, the actual data separation may be routine. In speech recognition for example, segmentation involves the separation of continuous speech into phonemes. In the field of photographic image analysis, segmentation is used to separate images into component images such as images of roads and rivers. The system of the present invention provides a method for learning the boundaries of component images within an input image using the self-organizing approach by allowing multiple associative memories to learn the boundary patterns in a sample of the input data without prior knowledge of the boundaries of the component images. This method may be generally applied beyond speech recognition and image analysis.

A suitable network for learning the boundary patterns using the system of the present invention is a feedforward adaption using a symmetric triggering network. Inputs to the network are applied directly to the separate associative memories of the network. The separate associative memories produce a best match pattern output for each part of the data to be segmented. In the system of invention the separate associative memories provide two or more subnetworks which compete to define data subsets, such as objects or anti-objects, according to previously learned examples. Due to the self-organizing nature of the symmetric triggering network, the specific characteristics which constitute the subsets of classifications may be specified wholly by examples. Multi-layer perceptron architecture may also be used in the system of the present invention rather than the feedforward adaptation using the symmetric triggering with tradeoffs in training time but advantages in speed.

DETAILED DESCRIPTION OF THE INVENTION

Figure 1:
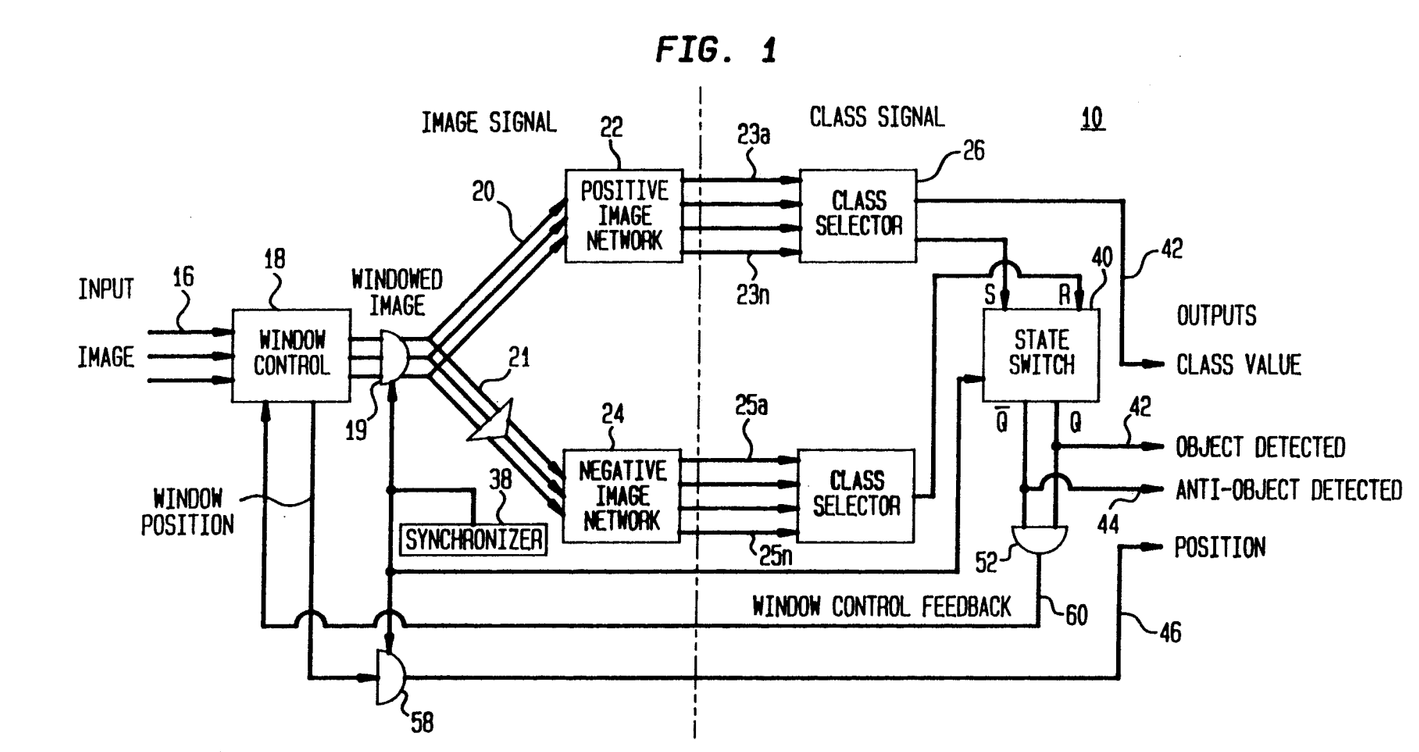
FIG. 1 shows the block diagram representation of the self-organizing neural network segmentation system of the present invention wherein two associative memories are provided.

Referring now to FIG. 1, there is shown self-organizing neural network segmentation system 10 of the present invention. Self-organizing neural network segmentation system 10 uses competition between neural network 22 and neural network 24 to separate a sequence of partial input signals into parts, or segments, from different object metaclasses. This method uses machine learning to demarcate objects contained in each of these metaclasses. It will be understood that the metaclasses of neural network segmentation system 10 of the present inventions are classes of classes.

Machine learning for classes without previously demarcated members, such as the spaces between letters in handwritten words, are self-organizing within the preferred embodiment of neural network segmentation system 10. A self-organizing system suitable for performing the operations of neural network segmentation system 10 of the present invention is taught by Charles Wilson in "Multiple-Memory Self-Organizing Pattern Recognition Network", U.S. patent application Ser. No. 07/701,484, which is herein incorporated by reference.

The system of Wilson provides a parallel, multi-map, self-organizing, pattern classification procedure similar to those believed to exist in the vertebrate mid-level visual cortex. This neural network uses a feed-forward architecture which allows multi-map features stored in weights acting as associative memories to be accessed in parallel and to trigger a symmetrically controlled parallel learning process. In the self-organizing recognition system taught by Wilson, recognition of the required input processing is learned in parallel with pattern recognition features using a multi-map procedure similar to those believed to exist in the mid-level visual cortex.

In the system of Wilson, the input data are applied directly to each of at least two associative memories. Any required pre-processing of input data is performed in parallel with the determination of a pattern rather than by prefilters such as Gabor filters. These two or more associative memories may determine objects and anti-objects. For example, one associative memory in the system of Wilson may determine a positive image and one associative memory may determine a negative image. The two associative memories of the self-organizing system of Wilson are symmetrically triggered in order to permit learning of optimal reconstruction of input data rather than using pre-selected external filters. This permits input data to be gated directly to the associative memories.

In the self-organizing neural network system taught by Wilson, smoothing and generalizing of the input data is done within the associative memories simultaneously with classifying the signals representative of the input images. It will be understood by those skilled in the art that the smoothing of the images performed simultaneously with the classifying taught by Wilson is a type of filtering process used to extract from noise the signal to be stored in a neural network during the learing cycle. The simultaneous generalizing is understood to be the process of training on one set of data and sorting out new data to find and maintain old data while simultaneously sorting the new data. For a further description see "Self-Organizing and Associative Memory," by T. Kohenen, 1989.

The smoothing and generalizing of Wilson are performed by the associative memories which are understood to be a pattern associative memory and relevance associative memory. The pattern memory is understood to mean a collection of information about a binary image or signal. For example, this information may be a logical map of portions of the image or portions of the signal wherein binary bits in corresponding locations are either on or off in order to provide a logical map. The relevance information is understood to mean statistical information on bits of a pattern, wherein this statistical information is determined over a training set. Thus relevance refers to statistical evidence, accumulated during the training set, on how often a particular bit is present when a particular image is present. For example, it is known in the art to assign a relevance of $+128$ if a bit is always present when an image is presented and $-128$ if it is never present when the particular image is presented. Positive relevance is a way of expressing a concept in neural networks of activation and negative relevance is a way of expressing inhibition in neural networks. Thus activation is equivalent to positive statistical correlation and inhibition is equivalent to negative statistical correlation.

Input signals within neural network segmentation system 10 of the present invention are applied to window control block 18 by way of system input lines 16. Under the control of window control feedback line 60, window control block 18 applies a windowed image to window gate 19. This image window signal applied to window gate 19 is representative of a window of the image represented by the signals of system input lines 16 of segmentation system 10. Window gate 19, under the control of synchronizer 38, applies the windowed image simultaneously to positive image network 22 by way of positive network input lines 20 and to negative input network 24 by way of negative network input lines 21.

The output signals from positive image network 22 and negative image network 24 appear on network output lines $23a-n$, $25a-n$ respectively. These network output signals are sequences of dynamic object and anti-object metaclass signals wherein match strengths between the input image of system input lines 16 and previously learned images stored in system 10 are indicated. In order for segmentation system 10 to learn character images, for example, character strings representative of images are sequentially presented as inputs to segmentation system 10. This permits positive image network 22, or positive metaclass network 22, and negative input network 24, or negative metaclass network 24, to be trained to thereby provide match strength signals on network output lines $23a-n$, $25a-n$. These match strength signals may be used to indicate which previously learned image represented by the signals on signal input line 16.

Thus it will be understood by those skilled in the art that self-organizing neural network segmentation system 10 solves the $O(n^2)$ number of anti-objects problem associated with the prior art. Rather than requiring n, in the anti-object space a generalized anti-object is specified in the method of segmentation system 10.

Figure 2:
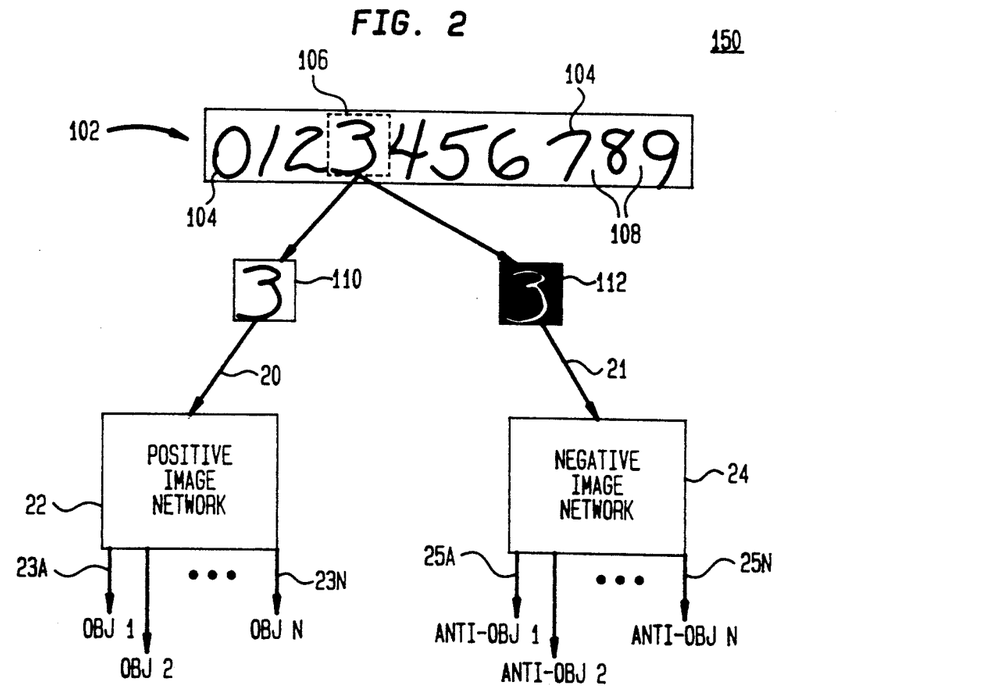
FIG. 2 shows a block diagram representation of a metaclass signal flow at a time $t_1$ within the self-organizing neural network segmentation system of FIG. 1 when the system of FIG. 1 is applied to an image.
Figure 3:
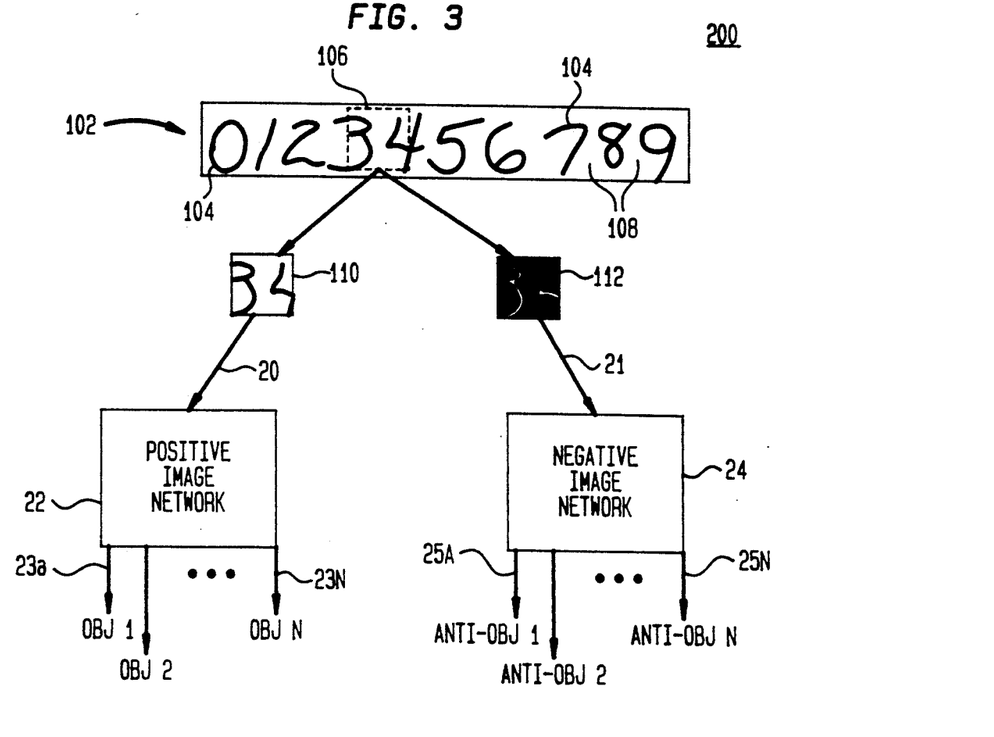
FIG. 3 shows a block diagram representation of a metaclass signal flow at a further time $t_2$ within the self-organizing neural network segmentation system of FIG. 1 when the system of FIG. 1 is applied to the image of FIG. 2.

Referring now to FIGS. 2, 3, there are shown metaclass signal flows 150, 200 as self-organizing neural network segmentation system 10 is applied to input image 102 at times $t_1$ and $t_2$ when (1) window frame 106 is substantially centered over the image of the numeral "3" and (2) window frame 106 is subsequently centered over space image 108 between numerals "3" and "4". It will be understood that time $t_2$ is a short period after time $t_1$ and that during that period sliding window 106 has progressed a short distance along image 102.

Figure 4:
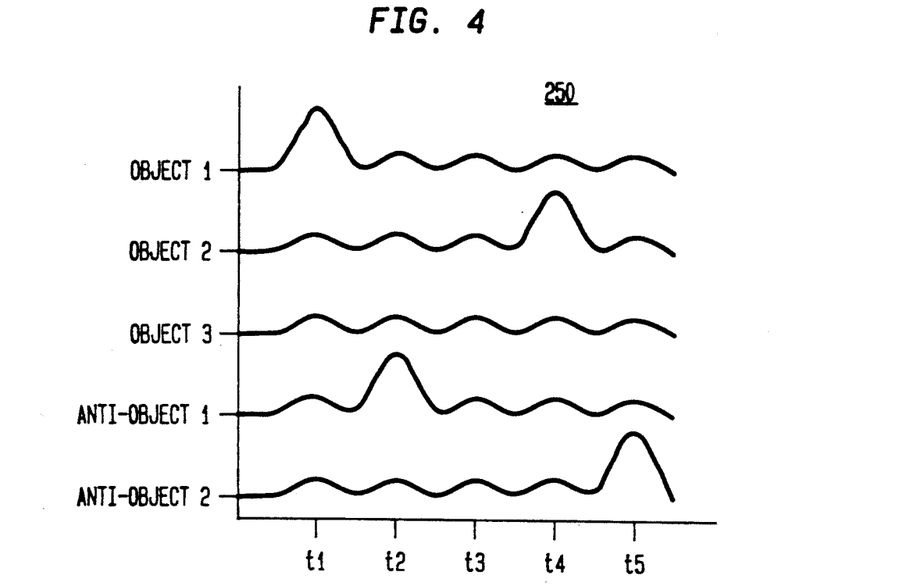
FIG. 4 shows a graphical representation of metaclass signals for a selection of objects and anti-objects when the system of FIG. 1 is applied to the image of FIG. 2.

Referring now to FIG. 4, there is shown graphical representation 250 of the metaclass signals of system 10 when system 10 is applied to image 102. For the time sequence t1 to t5 of graphical representation 250, signal responses 202-210 for each of the metaclass networks is shown. Metaclass signal flows 150, 200 show how segmented characters 104 and character space images 108 may be classified by positive image network 22 and negative image network 24, respectively, within neural network segmentation system 10. It will be understood by those skilled in the art that characters space images 108, or negative space 108, of image 102 is a space which the human eye would detect as a separation. Such a space, detectable by the human eye as a separation, may be characterized by increased light or a band of light or by a separation of shapes even though the objects on either side may actually touch. It is intended that spaces recognized by the human eye between characters be recognized as spaces, or negative spaces 108, by the network segmentation systems of the present invention in order that the network segmentation systems of the present invention may be able to reliably recognize segmentable images.

In the initial learning phase of segmentation system 10, positive images of segmented characters 104 are sent to positive image network 22 and negative or inverted images representing character space images 108 between segmented characters 104 are sent to negative image network 24 by way of network input lines 20, 21, respectively, as previously described. Working in parallel with each other, positive image network 22 learns the shapes of segmented characters 104 and negative image network 24 learns the shapes of character space images 108 between segmented characters 104.

After a sufficient number of segmented characters 104 and character space images 108 have been learned by segmentation system 10, a new image which has not been previously segmented may be applied, along with its negative image, to positive image network 22 and negative image network 24 respectively. The new image is applied to image networks 22, 24 in accordance with sliding window 106 under the control of window control 18. All image sections windowed by sliding window 106 are applied to both positive image network 22 or character network 22 and negative image network 24 or space network 24 simultaneously. In addition to the forward flow of data through neural network segmentation system 10, system 10 provides a feedback mechanism for dynamic control of image window 106 by way of window control feedback line 60.

Image networks 22, 24 then generate association strength signals or match strength signals for all previously detected segmented characters 104 and character space images 108, or character space shapes 108, according to the image applied by sliding image window 106. If either a previously learned segmented character 104 or a previously learned space shape 108 is detected, the representation of the class signal of the winning character 104 or space 108 is updated within image network 22 or image network 24. Otherwise sliding image window 106 is shifted along input image 102 and the process is repeated within segmentation system 10.

The continuous shifting of the input within neural network segmentation system 10 generates a sequence of output signals on network output lines 23a-n of positive image network 22 and network output lines 25a-n of negative image network 24. These output signals give estimates of the probability that sliding image window 106 is centered over either a character 104 corresponding to an assigned output line 23a-n or a space 108 corresponding to an assigned output line 25a-n.

Thus in image networks 22, 24 the image windowed by window 106 is compared in parallel with the memories stored in segmentation system 10 for each of the learned classes, and similarity values are computed. Two similarity values are computed for each class, one from the pattern comparison of positive image network 22 and one from the relevance comparison of negative image network 24. The triggering unit decides if the image represented by the signals of system input lines 16 belongs to a known class previously or should be assigned to a new class. If both similarity values are above respective thresholds, the image of lines 16 is assigned to the tentative class; the pattern memory and relevance memory use the image for learning. Otherwise a new class is begun and the image is used for learning by the new class. The total number of classes within system 10 is determined by the training data and the threshold values chosen. After learning is completed on all images, each class is assigned to a character. Up to this time, the identity of each input image has not been used.

Three essential features of implementing self-organizing neural network segmentation system 10 in this manner are: (1) different feature classes use individual association rules for pattern comparison, (2) different feature classes use individual learning rules for pattern modification, and (3) all feature classes contribute symmetrically to learning.

Within graphical representation 200, the object or anti-object class with the greatest strength identifies the data located within current sliding image window 106 of image 102. The dynamic time histories of these probability signals are used to locate specific characters and the optimal segmentation points in the input image data of input lines 16.

Figure 5:
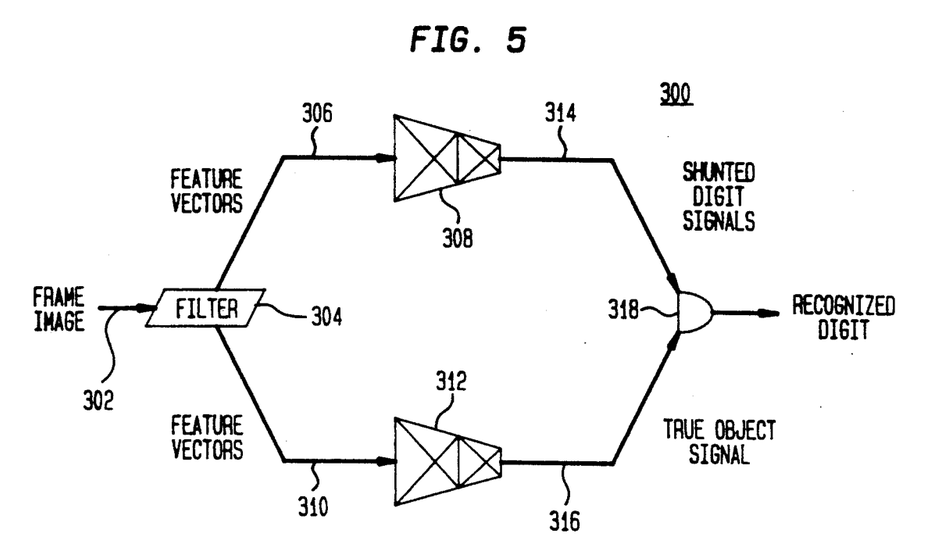
FIG. 5 shows the multi-layered perceptron segmentation system of the present invention.

Referring now to FIG. 5, there is shown dual multi-layer perceptron network 300. Dual multi-layer perceptron network 300 classifies images by generating feed forward activations across a fully connected network containing an input layer, one hidden layer, and an output layer. The input layers of networks 308, 312 of dual multi-layer perceptron network 300 receives the output of filter 304. Filter 304 may be a convention Gabor filter 304 or a conventional Karhunen-Loeve filter 304. For further information on filters such as Karhunen-Loeve filter 304 see A. K. Gain, "Fundamentals of Digital Processing," pages 163-174, Prentice-Hall, 1989. For a more detailed description of networks 308, 312, see D. E. Rumelhart, G. E. Hinton and R. J. Williams, "Learning Internal Representations by Error Propagation," Parallel Distributed Processing: Explorations in the Microstructure of Cognition, D. C. Rumelhart, J. L. McClelland, et al., Volume 1: Foundations, pp. 318-362, MIT Press, Cambridge, 1986. Supervised training within dual multi-layer perceptron network 300 is done using scaled conjugant gradient learning. Network 300, trained with Gabor feature vectors, may achieve character recognition accuracy of 99.8% for medium quality machine print.

Perceptron network 300 receives a frame image by way of network input line 302 which applies the frame image to Gabor filter 304 which forms the input of multi-layer perceptron network 300. Feature vectors, extracted by Gabor filter 304 and representative of the image on input line 302, are applied simultaneously to networks 308, 312 by lines 306, 310 respectively. Signals, representative of matches between the signals on input line 302 and previously stored signals in networks 308, 312, are applied to output gate 318 by way of lines 314, 316.

Figure 6:
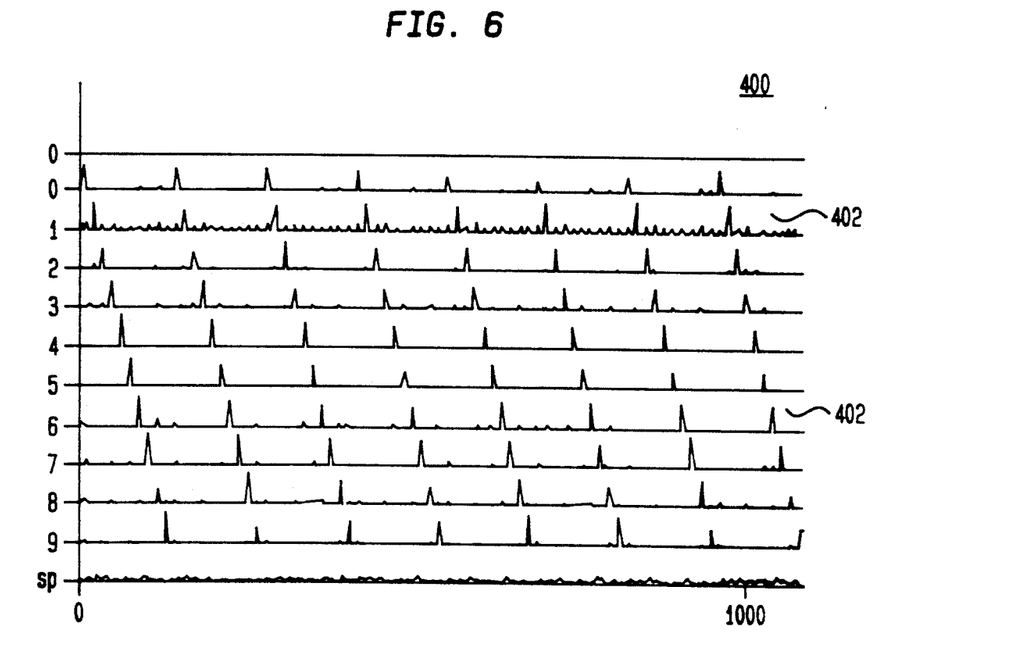
FIG. 6 shows the associative memory activations produced when the trained self-organizing neural network segmentation system of FIG. 1 is presented with a series of test frames.

Referring now to FIG. 6, there is shown graphical response representation 400 of self-organizing neural segmentation network 10 as window 106 slides repeatedly over a plurality of images 102. It will be understood that as sliding window 106 moves from digit "0" to digit "9", segmentation network 10 provides a corresponding response on each line 402 of response representation 400 corresponding to its respective numeral.

Figure 7:
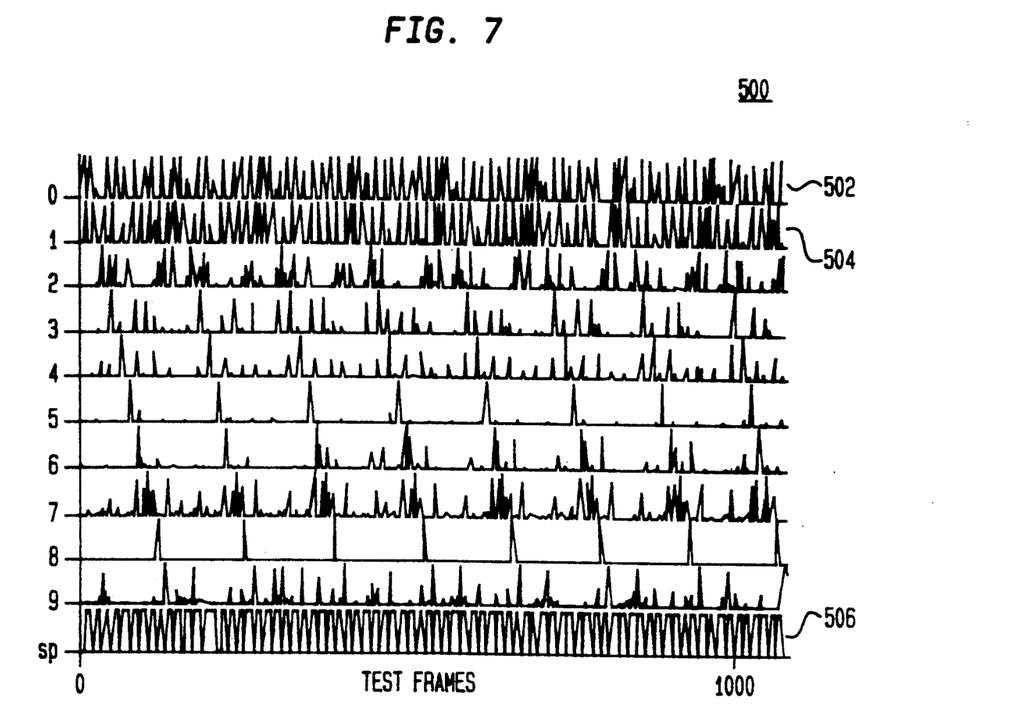
FIG. 7 shows the triggers produced when the multi-layered perceptron system of FIG. 5 is applied to a series of test frames.
Figure 8:
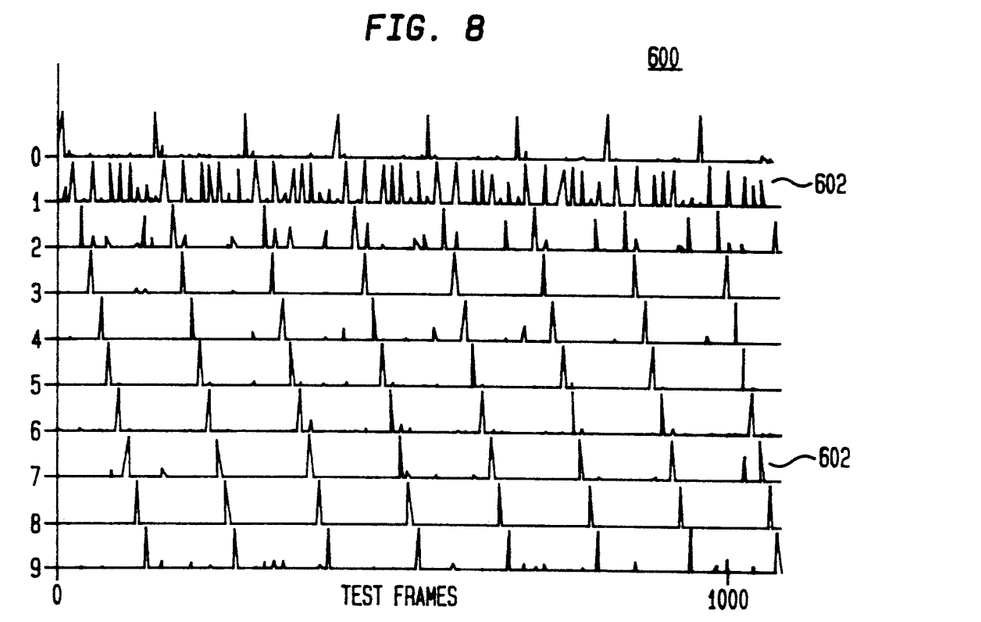
FIG. 8 shows the triggers produced when the multi-layered perceptron system of FIG. 5 is applied to the same test frames as those of FIG. 7 wherein triggering is gated with a space detection signal.

Referring now to FIGS. 7, 8, there are shown graphical response representations 500, 600 of multi-layer perceptron network 300. In providing graphical response representations 500, 600, the response of perceptron network 300 was recorded as window 106 slides repeatedly over a plurality of images 102. Response representation 500 shows many false responses on row 502, corresponding to the digit "0", and on row 504, corresponding to the digit "1". The excess responses of the "0" detector corresponding to row 502 occur because the zero detector tends to respond to pieces of any curves. For example, it tends to respond to curves associated with the digit "2". In a similar manner, the "1" detector corresponding to row 504 of representation 500 tends to respond to vertical lines, for example, the vertical line associated with the digit "7". Thus, many false responses are provided on rows 502, 504 of graphical response representation 500.

Graphical response representation 600 shows the response of multi-layer perceptron network 300 to the same data as the data of graphical response representation 500. However, when applying network 300 to the same data in order to obtain the data of representation 600, the activations are logically gated in accordance with the detection of a space between characters. These space detections are indicated on line 506 of representation 500. This gating is adapted to permit activation of multi-layer perception system 300 only when sliding window 106 is not upon a space 108. Thus, it will be understood by those skilled in the art that multi-layered perceptron network 300 provides an alternate solution to the O(n²) anti-object problem by using a separate object/anti-object output gate.

The following is a general statement of how the data of graphical response representations 400, 500 600 were collected. It was collected using a single trained network 10, 300 to perform both character segmentation and recognition. Networks 10, 300 were trained to classify the ten digit classes, "0" through "9", plus an additional class, the space character, which is simply an empty frame. Using this training strategy, the space character represents the most extreme case of anti-object, one which is void of any character image data.

Networks 10, 300 were trained using one thousand one hundred input patterns. Each input pattern was a character image scale normalized to thirty two by thirty pixels. The training set contained one hundred examples of each digit class, "0" through "9". In addition one hundred space characters 108 were included. Space characters 108 were all represented as blank white images. The training digits were created by segmenting a full page of twelve-point Courier machine printer produced from a laser printer. The digits were scanned at three hundred dots per inch binary, and a segmenter, using traditional image processing implemented on a massively parallel computer, was used to automatically segment one page of text. Upon training, self-organizing neural network 10 created twelve pairs of memories, two classes for the digit "0", one class for each of the remaining nine digits, and one class for the space character.

A testing set was created by incrementally moving a window along a line of text and cutting successive frames. A line of twelve-point Courier text containing eighty digits in the repeated order of "0" through "9" was used. The repeated order minimized the number of anti-objects used in these experiments. A window, thirty two pixels in width was incremented in steps of two pixels across the line of digits creating a sequence of eleven hundred and four individual frames.

As previously indicated, graphical response representation 400 represents the activation of associative memories within image networks 22, 24 when trained segmentation system 10 was presented with the entire sequence of testing frames. The signal responses produced from each frame presentation are plotted for the twelve self-organized memories. Successive frame presentations are represented horizontally, left to right. The associative memory responses are stacked vertically as separate signal channels. A repeating pattern in signal spikes can clearly be seen in this plot. As the frames proceed left to right, the true objects, "0" through "9," periodically become centered. When this occurs, the appropriate memory within segmentation system 10 fires strongly.

Any time a frame contains an anti-object the network activation is absorbed by associative memory network 24 associated with the space character. Associative memory network 22 never receives any signal because it has a very low statistical relevance map due to its pattern memory being matched with only a single example of a numeral "0." Thus representation 400 demonstrates how network 10 trained on ten digit classes and a space character can be used to distinguish true objects from anti-objects and concurrently be used to classify the true-objects.

Using the same single network strategy, multi-layered perceptron network 300 was trained using Gabor feature vectors. Each feature vector contained thirty coefficients created by applying thirty spatially turned Gabor functions to a thirty by thirty scale normalized character image. The Gabor functions were tuned to the four quadrants of the normalized image with four equally spaced orientations within each quadrant and both sine and cosine phases. The consistent dimensions of thirty are no coincidence. The massively parallel computer used to compute the coefficients within perceptron system 300 contains two thirty by thirty grids of processing elements.

Multi-layered perceptron network 300 was trained using 5,192 Gabor feature vectors. The training set contained seven hundred and twenty feature vectors from images of each digit class, "0" through "9", and seven hundred and twenty feature vectors representing the space character. The network contained thirty input neurodes, thirty hidden neurodes, and eleven output neurodes. After scaled conjugate gradient training, multi-layered perceptron network 300 was tested using feature vectors computed from the same sequence of 1,104 frames used to test self-organizing neural network 10.

The results from testing multi-layered perceptron network 300 are shown as graphical representation 500. The presentation of Gabor feature vectors computed from successive test frames is represented horizontally, left to right within representation 500. The signals of the eleven output neurodes are stacked vertically. The results shown here are substantially different from the results produced by self-organizing neural network 10 as shown in graphical representation 400. The output neurode activations of the ten digit classes of multi-layered perceptron network 300 contain significant noise.

Notice that the signal plotted for the output neurode representing the space character is very periodic with local minima occurring at regular intervals. Upon inspection, it was determined that the frames coinciding with the points of local minima contained images of centered characters. Graphical response representation 600 shows the results of using the signal from the space character as a shunt across the other channels so that when the space character signal is strong the network classifications are suppressed. Signals 602 of response representation 600 are thus the result of multiplying the signals from the digit class neurodes of graphical response representation 500 by one minus the signal from the space character neurode. Combining the activations of multi-layered perceptron network 300 in this way removes the majority of noise of representation 500. However, some noise remains within the "1" and "2" channels.

The single network strategy, which works well with neural segmentation network 10, is not as effective with multi-layered perceptron network 300. It is believed that this difference may be intuitively linked to the use of Gabor feature vectors. The spatially tuned Gabor functions used to produce the thirty two coefficient feature vectors work as course stroke detectors. Ambiguities arise when frames of anti-objects contain vertical strokes and curvature pieces of neighboring characters. The artifacts contribute to the false positive spikes shown in the signals for digit classes "1" and "2."

Experiments were conducted to improve the performance of multi-layered perceptron network 300 beyond that shown in graphical representation 600. A second multi-layered perceptron network 300 (not shown) or further network 300 (not shown) was trained to classify frames into the two general categories, true objects and anti-objects. Further network 300 may be referred to as object/anti-object network 300. Unlike the training of the single network solution, which generalized all anti-objects into a single space character, further network 300 was trained with frames containing pieces of two neighboring characters with their intervening space centered in the frame.

Further network 300 was trained using nine hundred fifteen Gabor feature vectors. The training set contained forty six feature vectors from images of each digit, "0" through "9," assigned to the true object class. In addition, the training set contained four hundred fifty five feature vectors computed from real anti-objects. Each anti-object was created by centering a window over the cut-point made by a page segmenter when separating two neighboring digits. Further network 300 was a multi-layered perceptron network 300 having thirty two input neurodes, sixteen hidden neurodes, and two output neurodes. Further network 300 was trained using the scaled conjugate gradient technique with all feature vectors of digits mapped to the first output neurode and with all feature vectors of anti-objects mapped to the second output neurode. In order to emphasize training character space images 108 between segmented characters 104, all nine hundred fifteen feature vectors were computed from images in reverse video, white print on a black background.

Figure 9:
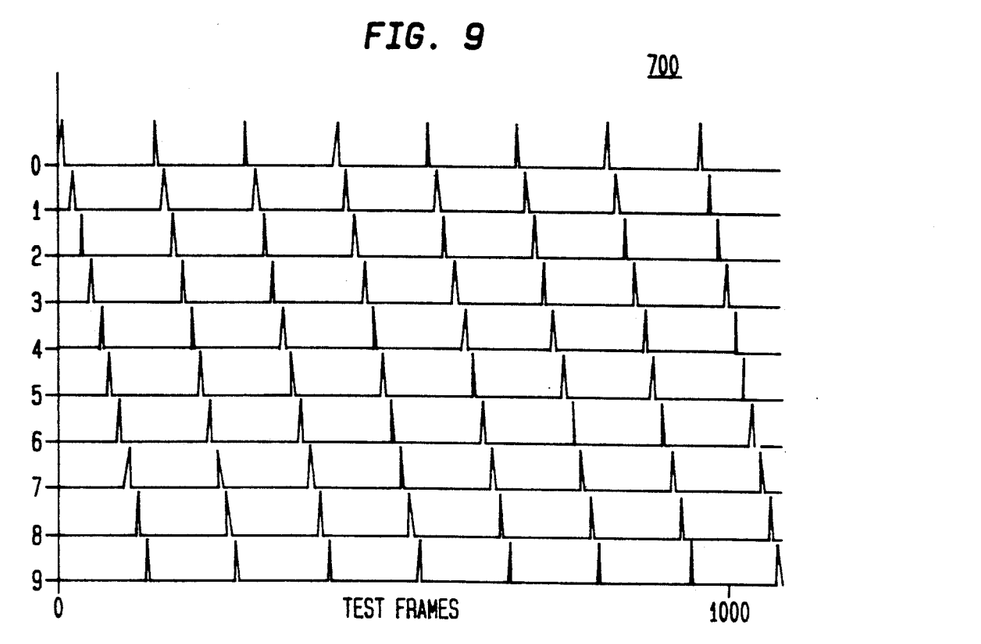
FIG. 9 shows the triggers produced when two multi-layered perceptron systems such as those of FIG. 5 are applied to the same test frames as those of FIG. 7.

Further network 300 in combination a single network 300 was tested with the same test set used with single network 300 operating alone. However the images of the two networks 300 were in reverse video. The results of this combination are set forth as graphical response representation 700 in FIG. 9. Analyzing the activations of further network 300 revealed a very well defined anti-correlation between the true object and anti-object neurodes. Based on this observation, a two network solution was designed. This was accomplished by thresholding the true object signal of further network 300 and creating a logical mask at points of local maxima. All digit signals from first network 300 not coinciding with local maxima in the true object signal from further network 300 were set to "0". This is equivalent to only accepting classifications from the shunted digit signals of first network 300 when the true object activation of OA network 300 is significantly high. This two network solution results in 100% correct segmentation and recognition when presented the 1,104 frame testing set.

We claim:

1. A segmentation network for segmenting an image having features including a plurality of characters and a plurality of negative spaces between said characters, comprising:
   input means for receiving an input signal representative of an image to be segmented;
   means for extracting said features in response to said input signal;
   classifying means for classifying said extracted features;
   negative space determining means for determining a negative space of said plurality of negative spaces between said characters; and,
   said classifying means having means for preventing classification in accordance with said negative space determining means.

2. The segmentation network of claim 1, including self-organizing associative memory means comprising means for extracting said features and classifying said extracted features simultaneously.

3. The segmentation network of claim 2, wherein said negative space determining means comprises associative memory anti-object detection means.

4. The segmentation network of claim 3, wherein said associative memory anti-object detection means comprises means for detecting the anti-object of said image.

5. The segmentation network of claim 4, further comprising associative memory object detection means for determining said characters.

6. The segmentation network of claim 5, wherein said object detection means and said anti-object detection means are triggered symmetrically.

7. The segmentation system of claim 5, wherein differing associative memory detection means uses separate matching functions and stores objects and anti-objects in optimum metaclasses.

8. The segmentation system of claim 5, wherein differing associative memory detection means use separate learning rules.

9. The segmentation network of claim 5, wherein said associative memory object detection means and said associative memory object detection means operate in parallel on parallel data.

10. The segmentation network of claim 1, including multi-layer perceptron means wherein said means for extracting said features comprises a filter.

11. The segmentation network of claim 10, wherein said filter comprises a Karhunen-Loeve filter.

12. The segmentation network of claim 10, wherein said filter comprises a Gabor filter.

13. The segmentation network of claim 10, wherein said means for preventing classification comprises negative space gate means for controlling classification in accordance with anti-object detection.

14. The segmentation network of claim 1, wherein said extracted features correspond to both said characters and said negative spaces.

15. The segmentation network of claim 1, wherein all negative spaces of said plurality of negative spaces are represented as a single generalized negative space.

* * * * *